May 20, 1969     P. M. UTHE, JR., ET AL     3,445,750

ULTRASONIC FREQUENCY POWER SUPPLY

Filed Oct. 17, 1966

INVENTORS
PAUL M. UTHE JR.
LOREN G. WRIGHT
RICHARD E. GREENAN

BY Townsend & Townsend ATTY'S

United States Patent Office 3,445,750
Patented May 20, 1969

3,445,750
ULTRASONIC FREQUENCY POWER SUPPLY
Paul M. Uthe, Jr., Livermore, Loren G. Wright, Castro Valley, and Richard E. Greenan, Sunnyvale, Calif., assignors to Uthe Technology, Inc., Mountain View, Calif.
Filed Oct. 17, 1966, Ser. No. 587,283
Int. Cl. G05f 1/44
U.S. Cl. 323—1                                     5 Claims

ABSTRACT OF THE DISCLOSURE

An ultrasonic power supply that has a sufficiently low output impedance that it can be directly coupled to a load without an impedance matching transformer. The direct connection permits feedback signals from the transducer to be employed directly in the power supply to correct for changes in the transducer and the load to which it is connected. Two separate feedback circuits are provided: One for maintaining constant current (for driving magnetostrictive transducers) and the other for maintaining constant voltage (for driving ferroelectric and piezoelectric transducers). A mode switch for selecting one or the other modes is included.

---

This invention relates to an ultrasonic power supply for controllably exciting sonic transducers of the type used for cleaning, soldering, drilling, bonding, brazing and welding of materials.

Electromechanical transducers of the above-mentioned class respond to an alternating electrical stimulus to produce mechanical reactions of force and motion. The shape, size and composition of the transducer determine the mechanical resonant frequency thereof, and a power supply capable of delivering a frequency equal to the resonant mechanical frequency is employed to drive the transducer in the performance of its intended function. Connected in driven relation to the transducer is a coupling device for transmitting the vibratory force of the transducer to the medium to be excited. The physical characteristics of the coupling device determine its frequency of mechanical resonance.

Depending on the size, shape and composition of the transducer and the coupling device, there are certain frequencies of mechanical resonance at which the medium can be excited at large amplitudes with a sinusoidal electrical signal input. Optimum efficiency is secured when the driving frequency is equal to the mechanical resonant frequency of the transducer and the coupling device. The art of designing transducers and coupling devices therefor having appropriate mechanical resonant frequency relationships is so well developed that specific description of such transducers is here unnecessary.

The electrical impedance of the transducer and its associated coupling device changes with history and time. A power supply having provisions for compensating for these changes is provided by the present invention.

Sonic transducers are generally classified as magnetostrictive transducers, ferro-electric transducers, or piezoelectric transducers. Magnetostrictive transducers can, for the purposes of the present invention, be conveniently considered to be current operated devices whereas ferroelectric and piezoelectric transducers can be considered as voltage operated devices. The present invention provides a power supply having two modes of operation: One mode useful for driving magnetostrictive transducers in which current output is maintained constant and the voltage is varied with load; and a second mode, useful for ferro-electric and piezoelectric transducers, in which the output voltage is maintained constant and the output current is permitted to vary to accommodate varying transducer loads.

A power supply according to the present invention employs a quasi-symmetrical solid state output amplifier circuit. Such circuit according to the present invention is extremely stable and is readily adaptable for operation in either of the above-mentioned modes of operation. The circuit is so configured that the output impedance is low enough to substantially match that of the transducer, thereby eliminating a matching transformer and the distortion inherent therein. Moreover, the amplifier lends itself to control by either voltage or current proportional feedback circuitry thus affording convenient operation in either of the above-mentioned modes.

Further contributing to achievement of the objects of the present invention is a regulated bias supply circuit which prevents damage to system elements if the system is inadvertently overdriven. The bias supply is so arranged that it maintains the bias voltage at a constant value throughout the entire rated current capability of the apparatus. However, should the current rating of the apparatus be exceeded, the bias supply acts automatically to reduce the bias supply current delivered, thereby to protect components against failure.

Further contributing to the versatility of the sonic power supply of the present invention is a DC polarizing current supply which is necessary in driving magnetostrictive transducers. The bias supply is arranged to provide a constant bias current to the magnetostrictive transducer and is also arranged to avoid any interaction between the DC polarizing current and the alternating driving current or voltage.

The objects, features and advantages of the present invention will be more apparent after referring to the following specification and accompanying drawing, in which.

Figure 1:
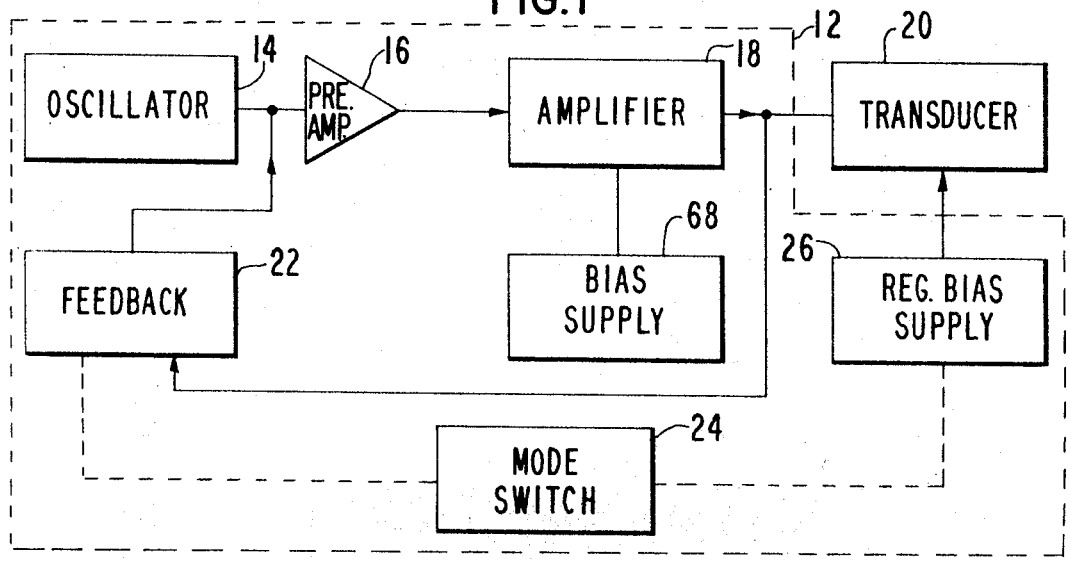
FIG. 1 is a block diagram of the apparatus of this invention.

Referring more particularly to the drawing, an ultrasonic power supply of the present invention is designated generally at 12 and includes an oscillator circuit 14 of more or less conventional form and adjustable throughout a suitable ultrasonic range, for example, from 40 kc. to 80 kc. The output of the oscillator is connected to a preamplifier or preliminary amplifier 16 where preliminary amplification of the AC signal from the oscillator is accomplished. Additionally, and as will appear in more detail hereinafter preamplifier 16 is adapted to respond to a signal fed back from the output of the apparatus to assure stable, regulated operation. The output of preamplifier 16 is connected to a power amplifier 18 which is of special design such that its output impedance is sufficient to match substantially the impedance of a electromechanical transducer 20 without the interposition of a matching transformer. The absence of a matching transformer in the present apparatus enhances the frequency and power stability of the apparatus. Amplifier 18 includes input circuitry that separates for independent amplification the positive-going and the negative-going portions of the signal fed thereto; such signals are combined in the amplifier output. Connected to the output amplifier 18 is the input of a feedback circuit 22 which applies a signal to the input of preamplifier 16 to adjust the bias thereof to maintain constant the output of amplifier 18. A mode switch 24 is operatively connected to feedback circuit 22 so that the feedback circuit can be made operative on the basis of either the output current of amplifier 18 or the output voltage thereof. Accordingly, either current operated transducers (magnetostrictive) can be driven with the present apparatus, or voltage operated transducers (ferroelectric or piezoelectric) can be operated with the apparatus. Also responsive to mode switch 24 is a regulated DC bias current supply 26 which is operative only in the mode of operation for magnetostrictive devices, since such devices typically require a direct current bias upon which is superposed an alternating current driving signal.

Figure 2:
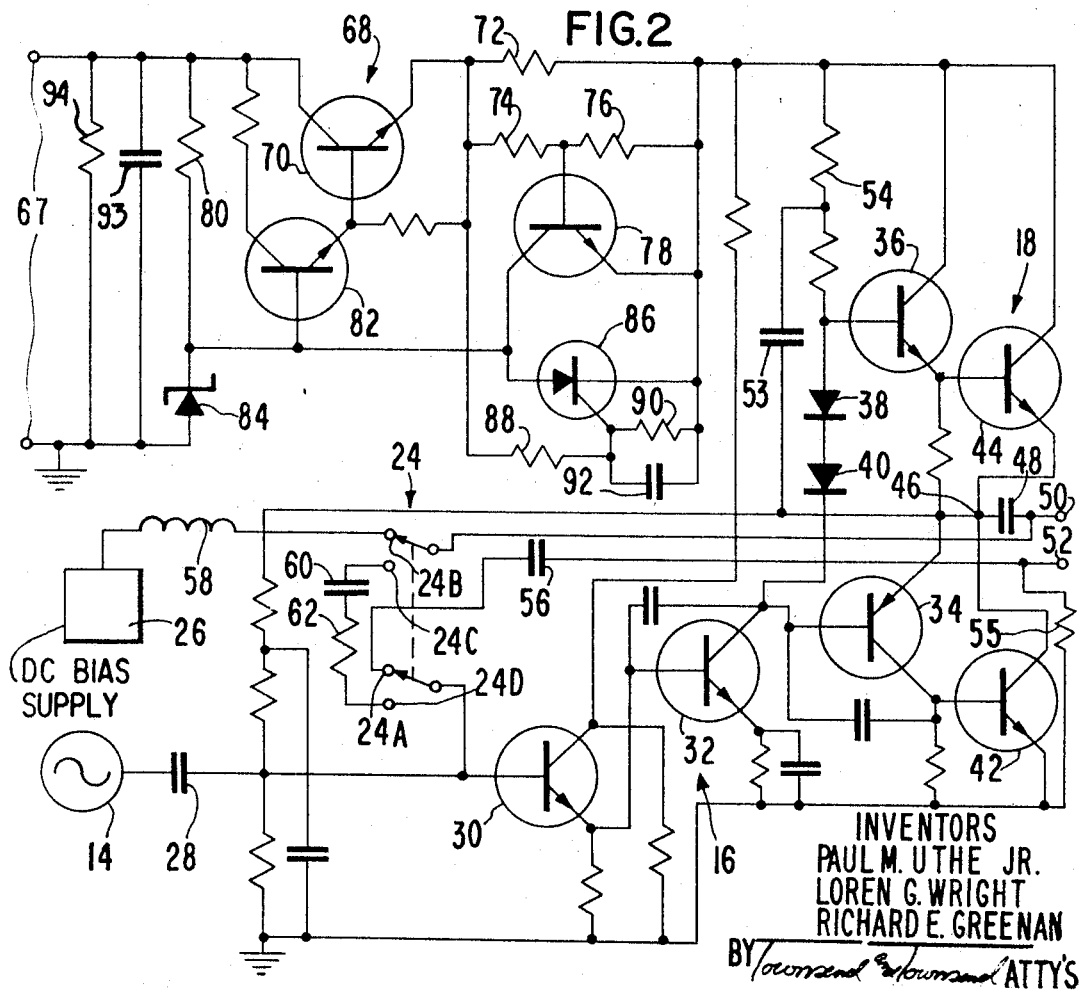
FIG. 2 is a schematic diagram of a preferred embodiment of a sonic power supply of the invention.

Referring to FIG. 2 oscillator 14 is coupled through a DC isolating capacitor 28 to the base terminal of a transistor 30 which forms a part of preamplifier 16. The emitter terminal of transistor 30 is connected to the input or base terminal of a transistor 32 which also forms a part of preamplifier 16. The collector or output terminal of transistor 32 is connected to the base of transistor 34 which transistor forms one input terminal to amplifier 18. The other input terminal is formed by the base terminal of a transistor 36, transistors 34 and 36 being of the opposite polarity so that one will respond to the positive-going portion of the AC signal and the other will respond to the negative-going portion of the signal. In the specific embodiment of the invention shown in FIG. 2, transistor 34 is of PNP configuration as a consequence of which it responds to the negative-going portion of the signal applied thereto, and transistor 36 is an NPN type as a consequence of which it responds to the positive-going portion of the signal applied thereto. Series diodes 38 and 40 are connected between transistor 32 and transistor 36 for biasing such transistors and for assuring minimum distortion of the two components of the signal.

Transistors 34 and 36 are respectively connected to output transistors 42 and 44. The collector terminal of transistors 42 and the emitter terminal of transistor 44 are commonly connected at 46 to which point is also connected an output capacitor 48. A connector terminal 50 affords connection of a transducer to the power supply of the invention. A grounded output connector terminal 52 provides the return for the transducer. Therefore, it will be seen that when transistor 44 is in a conductive state output terminal 50 will be positive with respect to output terminal 52 by a large value and that when transistor 42 is in the conductive state terminal 50 will be at substantially the same potential as output terminal 52. The impedance between output terminal connections 50 and 52 is extremely low and affords efficient power transfer to the transducer without necessity for a matching transformer.

A certain amount of positive feedback is applied to the input of transistor 36 to balance and render symmetrical the output signal produced by the amplifier and for this purpose a capacitor 53 connected to point 46 is provided which, in conjunction with a resistor 54 biases transistor 36 such that the positive-going portion of the output signal produced by transistors 36 and 44 is substantially equal and opposite to the negative-going portion produced by transistors 34 and 42.

As the ultrasonic transducer connected to output terminals 50 and 52 is driven to perform useful work, the electrical impedance of the transducer changes. Such impedance change arises from such phenomena as temperature variations, variations in the characteristics of the medium being excited, etc. In the case of a magnetostrictive transducer the sonic energy output thereof will remain substantially constant if the driving current into the transducer is held constant. The present invention includes feedback circuitry for assuring such constant current value. The present invention also includes feedback circuitry useful when ferroelectric or piezoelectric transducers are being driven to maintain constant the voltage applied to such transistors. In the case of such latter-mentioned transistors, the output energy of the transducer will remain substantially constant if the input voltage thereto is maintained constant, irrespective of impedance changes in the transducer due to heating and loading.

Mode switch 24 is provided for selecting either voltage proportional or current proportional feedback. As shown in FIG. 2 mode switch 24 is in a position for current proportional feedback so as to maintain the output current constant. To provide a feedback signal proportional to the current flowing through the transducer, a series resistor 55 is provided in the circuit; resistor 55 preferably has an extremely low resistance, for example, one ohm. A voltage proportional to the current flowing through the circuit is fed through a feedback capacitor 56 and a switch contact 24a to the base or input terminal of transistor 30 and preamplifier 16. Accordingly, a tendency toward increasing current flow through the transducer and through resistor 55 will effect a compensating reduction in the output current applied to the transducer.

Also connected in circuit through switch contacts 24b is a DC bias source 26, an RF choke 58 being connected in series with the bias supply so as to isolate the AC signal from the bias supply. Thus the signal existing at output terminal connection 50 is a DC current for polarizing the transducer on which is super-imposed an AC driving signal of suitable frequency and amplitude.

In order to controllably drive piezoelectric and ferroelectric transducers, the voltage across the input of such transducers is controlled. To operate the apparatus in this mode, switch 24 is turned to the position opposite that shown in FIG. 2, thereby eliminating feedback capacitor 56 from the circuit.

A feedback signal to the base terminal of transistor 30 is derived from output terminal connection 50 through a series combination formed by a capacitor 60 and a resistor 62 connected to the base through switch contacts 24c and 24d.

In supplying the transistors in the amplifier with bias current, precise regulation of the bias current and voltage is necessary for precise regulation of the output power of the transducer. Additionally, the bias current supply is arranged to limit the power produced so as to prevent overdriving of the circuit components. The present invention provides such bias supply which is designated at 68 in FIG. 2. A series transistor 70 is provided in the power supply circuit and by adjusting the bias at the base of such transistor, the voltage output of the power supply is regulated.

Bias power supply 68 includes input terminal 67 to which is connected an unregulated DC input voltage source of conventional construction. Connected across such unregulated voltage source is a series combination constituted by a resistor 80 and a Zener reference diode 84. Zener diode 84 has a reverse breakdown voltage approximately equal to the voltage at which it is desired to regulate the output of bias power supply 68, for example, 90 volts. The base terminal of a transistor 82 is connected in the circuit between resistor 80 and reference diode 84 so that the voltage on such base can never exceed the reverse breakdown voltage of diode 84. Should the output voltage on the emitter of transistor 70 approach the rated voltage of diode 84, due to a decrease in load current, the voltage across the emitter-base junctions of both transistors 82 and 70 will be reduced. The voltage reduction across the junctions causes a decrease in current flow therethrough which in turn increases the collector-emitter impedance of transistor 70 so as to reduce the output voltage. Contrariwise, if the output voltage is less than the reference voltage of Zener diode 84, the base-emitter junctions of the transistors are forward biased, thus reducing the collector-emitter impedance of transistor 70, and therefore increasing the output voltage. In this way the output voltage of bias power supply 68 is maintained at a rated voltage approximately equal to the reverse breakdown voltage of Zener diode 84. For limiting the output current of bias power supply 68 a resistor 72 is provided in series with the output of bias power supply 68 so that a voltage is developed across the resistor which is proportional to the magnitude of the current produced by the bias supply. Resistor 72 is preferably of a very small resistive value, for example, one ohm. In shunt with resistor 72 is a voltage divider formed by resistors 74 and 76 which bias a transistor 78 by an amount proportional to the voltage drop across resistor 72. In series with the collector-emitter circuit of transistor 78 is a resistor 80 to establish the voltage at the collector of transistor 78 as inversely proportional to the voltage drop across resistor 72, and therefore proportional to the output current from the bias supply. The base terminal of transistor 82 is connected to the collector of transistor 78 so that the voltage on the base is reduced as the output current through resistor 72 increases. The amount of such reduction is determined by the circuit parameters so that the output current is limited to a magnitude that does not adversely affect the components of the circuit.

The bias current power supply will compensate for ordinary variations occurring during use of the apparatus of the invention. Should a sustained excess current demand be imposed on the bias power supply, for example, as a result of a short circuit between output terminal connecters 50 and 52, the bias supply is adapted to be totally disabled. For this purpose a silicon controlled rectifier 86 is connected across transistor 78, the anode of the silicon controlled rectifier being connected to the collector of the transistor and the cathode being connected to the emitter of the transistor. The gate terminal of the silicon controlled rectifier is connected to a voltage divider circuit formed by series resistors 88 and 90. Connected in shunt with resistor 90 is a capacitor 92 which must be substantially fully charged in order for the gate to drive the control rectifier into a conductive state. Resistors 88 and 90 are selected so that the voltage at the control rectifier gate will be less than the voltage required to fire the rectifier so long as the current flow through resistor 72 does not exceed its rated value. When the bias supply is overdriven for a time sufficient to fully charge capacitor 92, the gate-cathode voltage is sufficient to drive control rectifier 86 to a conductive state, thereby decreasing the base-emitter voltage on transistor 82 so as to turn off the latter transistor. Thus, capacitor 92 affords a time delay which disables the bias power supply only after an overload condition has existed for a substantial time. When such overload occurs and when silicon controlled rectifier 86 is driven to the conductive state, transistor 70 is cut-off, so as to cause an increase of the voltage across terminals 67. Such voltage is stored in a capacitor 93, connected across terminals 67. Consequently, a forward bias is maintained across rectifier 86 so as to preclude delivery of current from bias supply 68 until power input to terminals 67 is interrupted. On such interruption, capacitor 93 discharges through a resistor 94 to ready bias supply 68 for operation when power is next connected to terminals 67.

The operation of the present invention is as follows: with mode switch 24 at the position shown in FIG. 2, a magnetostrictive transducer is connected across terminals 50 and 52. A biasing current, for example, one ampere, is supplied by DC current source 26 through contacts 24b of the mode switch. The frequency and amplitude of the signal delivered by oscillator 14 are then adjusted in accordance with the characteristics of the transducer and the medium which it is adapted to excite. The oscillator signal is preliminarily amplified in preamp 16. The negative-going portion of the output of the preamp is amplified by transistors 34 and 42, and the positive-going portion thereof is amplified by transistors 36 and 44, as described above. The resulting AC signal produced at circuit point 46 and coupled through capacitor 48 to the transducer is developed across an extremely low internal impedance so as to render a coupling or matching transformer unnecessary. Positive feedback to the base of transistor 36 through capacitor 53 enhances the positive-going portion of the signal from transistor 44 as a consequence of which the signal across output terminals 50 and 52 has a peak-to-peak value almost equal to that of the voltage produced by bias power supply 68.

Because bias power supply 68 provides a constant voltage across the amplifier circuit, the output of the amplifier is extremely stable both in amplitude and frequency characteristics. Stability is further enhanced, because the output circuitry to the transducer operates substantially independently of frequency.

Should the impedance of the transducer change either by internal heating within the transducer or a change in the characteristics of the medium being driven, the current through the windings of the magnetostrictive transducer tend to change. Such a change is reflected by a change in the voltage across resistor 55 which voltage is applied through capacitor 56 and contacts 24a to bias the base of transistor 30 so as to compensate for the change. Thus, the ultrasonic power output of the transducer to the medium is maintained constant irrespective of impedance changes within the transducer since the magnitude of the current to the transducer is maintained constant by the feedback circuit that includes resistor 55 and capacitor 56. Should the system be overloaded, bias supply 68 limits the degree of overloading as described above and if the overload condition remains for a sufficient period, the bias supply, and therefore the entire circuit, will be disabled since capacitor 92 will charge up so as to drive silicon controlled rectifier 86 to a conductive state.

In driving piezoelectric or ferroelectric transducers, mode switch 24 is turned to the position opposite that shown in FIG. 2 so that contacts 24c and 24d are completed. The input terminals of the transducer are connected across terminals 50 and 52, and a signal proportional to the voltage thereacross is fed back to the base of transistor 30 through capacitor 60 and resistor 62. Such feedback signal compensates for variations in voltage across terminals 50 and 52 and maintains such voltage at a constant value by increasing or decreasing the current supplied to the transducer to compensate for any impedance changes in the transducer and/or in the medium being excited by the transducer. As described previously, bias supply 68 accurately powers the amplifier system so that the magnitude and frequency output is maintained in a stable condition and is protected against overloading.

Thus it will be seen that the present invention provides an ultrasonic power supply that achieves frequency and amplitude stability without frequency feedback and without interposition of a matching transformer in the output thereof. By eliminating the matching transformer a frequency sensitive component present in known prior art systems of this type is eliminated, which characteristics of the present invention contributes greatly to its stability. Moreover, the system is virtually incapable of being overdriven due to the current and voltage regulation afforded by bias power supply 68.

Although one embodiment of the present invention has been shown and described it will be apparent that other adaptations and modifications can be made without departing from the true spirit and scope of the invention.

What is claimed is:

1. Apparatus for driving an ultrasonic transducer comprising: means for generating an AC voltage signal; a preliminary amplifier connected to said generating means for preliminarily amplifying the AC signal produced thereby; an output power amplifier connected to said preliminary amplifier, said output power amplifier including means at the input thereof for separating the positive-going portion of the AC signal from the negative-going portion of the AC signal, a first transistor for amplifying the the positive-going portion, a second transistor for amplifying the negative-going portion of the signal, and means for connecting the respective emitter-collector circuits of said transistors so as to form a common point between said transistors; a coupling capacitor connected to said common point for coupling the output to a load; and a feedback means for connecting to the input of said preliminary amplifier a signal proportional to the power supplied by the apparatus to the transducer, said feedback means acting negatively so as to decrease the gain of said preliminary amplifier in response to an increase in the output power of said power amplifier means and thereby maintain constant the output of said apparatus.

2. The invention of claim 1 wherein said feedback means comprises: a first feedback circuit comprising means for developing a voltage proportional to the current delivered from said amplifier and means for capacitively coupling said voltage to said preliminary amplifier and a second feedback circuit comprising means for capacitively coupling the output voltage of said preliminary amplifier to the input thereof, and means for selectively connecting one of said feedback circuits in the apparatus, whereby with said first feedback circuit in operation the apparatus drives a magnetostrictive transducer at a constant current and whereby when said second feedback circuit is connected in the apparatus the apparatus drives a ferroelectric or piezoelectric transducer at a constant voltage.

3. Apparatus according to claim 2 including a constant current power supply and means responsive to said selective connecting means for connecting said power supply to the transducer only when said first feedback circuit is actively connected in the apparatus.

4. Apparatus according to claim 1 including means for supplying bias power to said amplifier and said preliminary amplifier, said bias power supplying means comprising an unregulated voltage power supply, a transistor having its collector-emitter circuit connected in series with one output terminal of said unregulated power supply, means for sensing a signal proportional to the output current of said transistor, and means connecting the signal sensed to the base of said transistor for limiting the output thereof.

5. Apparatus according to claim 4 wherein said signal sensing means comprises a silicon controlled rectifier having an anode operatively connected to the base of said transistor and a cathode biased at a voltage sufficient to substantially reverse bias the base-emitter junction of said transistor when said silicon controlled rectifier is rendered conductive, said silicon controlled rectifier also including a gate electrode, means including a capacitor and resistor in parallel connecting said gate electrode to said signal proportional to the output current so that when the output current exceeds a preselected magnitude said capacitor charges to a voltage sufficient to trigger said gate terminal and switch said silicon controlled rectifier to a conductive state, whereby the bias voltage on the cathode of said silicon controlled rectifier is connected to the base of said transistor to turn off said transistor.

References Cited
UNITED STATES PATENTS 2,847,637  8/1958  Grib _____ 323—31 X
3,303,388  2/1967  Means _____ 317—33

JOHN F. COUCH, *Primary Examiner.*

A. D. PELLINEN, *Assistant Examiner.*

U.S. Cl. X.R.

307—38; 317—33; 323—20, 23, 32; 330—102